United States Patent [19]

Broockman et al.

[11] Patent Number: 4,499,608
[45] Date of Patent: Feb. 12, 1985

[54] TERMINAL DEVICE HAVING CLOSED CHAMBER COMMUNICATIONS BETWEEN FUNCTIONAL UNITS

[75] Inventors: Eric C. Broockman; Robert T. Cato, both of Raleigh; Robert C. Lynch, Cary, all of N.C.

[73] Assignee: International Business Machines Corporation, Armonk, N.Y.

[21] Appl. No.: 457,531

[22] Filed: Jan. 12, 1983

[51] Int. Cl.³ ............................................... H04B 9/00
[52] U.S. Cl. ...................................... 455/607; 455/617
[58] Field of Search ............... 455/600, 601, 602, 605, 455/606, 607, 617, 612, 613, 608, 618; 250/551; 370/1, 3, 4; 307/311

[56] References Cited

U.S. PATENT DOCUMENTS

| | | | |
|---|---|---|---|
| 3,710,122 | 1/1973 | Burcher et al. | 455/603 |
| 3,912,876 | 10/1975 | Muller | 370/1 |
| 4,063,083 | 12/1977 | Cathey et al. | 455/613 |
| 4,358,858 | 11/1982 | Tamura et al. | 455/607 |
| 4,393,515 | 7/1983 | de Neumann | 455/606 |

Primary Examiner—Joseph A. Orsino, Jr.
Attorney, Agent, or Firm—Joscelyn G. Cockburn

[57] ABSTRACT

A data processing terminal device includes a substantially enclosed optical chamber which serves as a wireless communication "bus" between pluggable functional units such as a controller unit, printer units, display units, etc. Each functional unit includes a transducer having an emitter component for injecting optical energy into the cavity and a detector component for sensing optical energy injected by transducers of other functional units. The energy distribution within the cavity is shaped by elliptic parabolic reflectors, preferably molded integrally with the floor of the chamber structure.

16 Claims, 9 Drawing Figures

FIG. 6
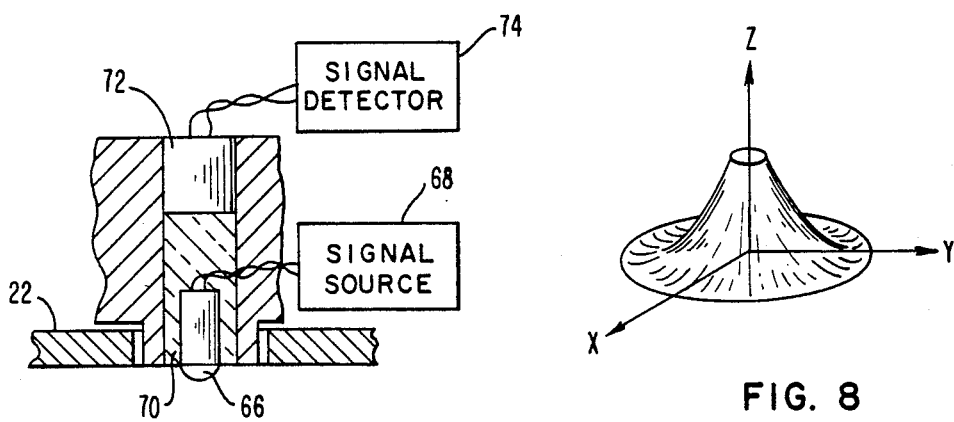
FIG. 8
FIG. 7
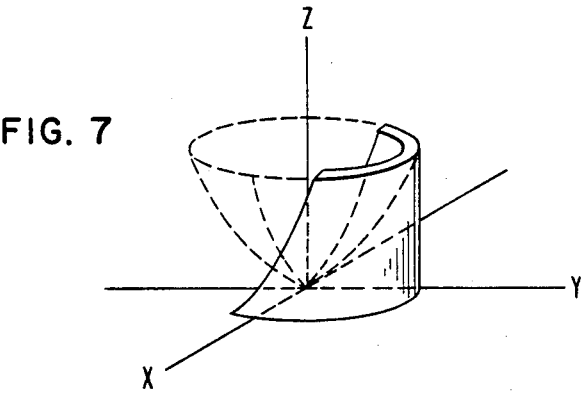
FIG. 9
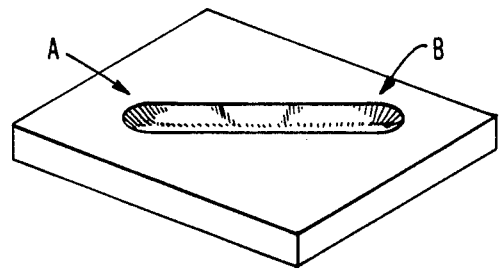

TERMINAL DEVICE HAVING CLOSED CHAMBER COMMUNICATIONS BETWEEN FUNCTIONAL UNITS

TECHNICAL FIELD

The present invention relates to data processing terminal devices and more particularly to data processing terminal devices in which self-contained functional units communicate through a closed chamber.

BACKGROUND OF THE INVENTION

Any data processing terminal device, ranging from a simple calculator to a complex point-of-sale terminal, can be viewed as a combination of functional units (controllers, printers, displays, card readers, etc.), each of which has a dedicated function to perform as well as a need to exchange data and control signals with at least certain of the other functional units.

Conventionally, the functional units have been linked through wired connections usually in the form of electrical cables. There are known disadvantages to the use of electrical cables in terminal devices. Such cables can represent a significant portion of the component cost of a terminal device. The time (and labor cost) required for assembly of terminal devices with electrical cables can also be significant. Moreover, electrical cables may be susceptible to electrical noise or stray signals which can produce errors in the data or control information being transmitted between functional units.

To avoid some of these problems, terminals have been proposed which would utilize fiber optic links between at least some of the functional units. Fiber optic links are less susceptible to noise or stray signals but thus far, cost more and are harder to assemble than electrical cables used for the same purposes.

To overcome some of the known problems of electrical or optical cable links between functional units in terminal devices, attempts have been made to use a cable-free chamber to provide optical links between functional units.

U.S. Pat. No. 4,063,083 discloses a system having an optical loop in which a single beam of optical energy is transmitted along a straight line path within a closed chamber from one pluggable card to the next. At each card, the optical energy may be detected, modified and passed on to the next card along the path. Lenses are included for maintaining the beam focus.

While the approach disclosed in this patent avoids some of the problems inherent in the use of electrical or optical cables, certain other problems seem to be created. Since all communications is along a single linear path defined by card-attached optical elements and beam-folding mirrors mounted within the chambers, the terminal device would have to be carefully assembled to maintain the proper beam alignment. Moreover, the arrangement is somewhat inflexible in that the cards themselves must be arranged in series along the beam path.

An alternative approach to closed chamber optical communications is disclosed in co-pending application Ser. No. 362,681, filed Mar. 29, 1982, and assigned to the assignee of this invention. In that application, one or more functional units can be plugged into a frame adjacent a substantially enclosed optical chamber. A transducer on each functional unit can inject optical energy into the chamber through an opening in one wall thereof and can detect optical energy injected by other transducers through similar openings. Within the optical chamber, injected optical signals are diffusely reflected from the interior walls of the chamber, thereby "flooding" the chamber with optical energy. The diffusely reflected signals are received by all functional units which are in place.

While this approach avoids many of the problems of cabled connections and is more flexible than the single beam loop approach discussed above, it is not free of drawbacks. Typically, the coefficient of reflectance of suitable material for the chamber walls is on the order of 0.8, which means that 20% of the optical energy incident on the wall is absorbed at each reflection. A signal which is reflected many times before reaching a desired transducer may be significantly degraded due to this repeated absorption and due to scattering at each reflection.

SUMMARY OF THE INVENTION

The present invention overcomes many of the problems inherent in the use of cable connections or of known closed chamber communications techniques.

The invention may be characterized as a data processing terminal having a substantially enclosed chamber with interior walls and a plurality of functional units mounted outside of the chamber. Each of the functional units includes a transducer for injecting radiation into and for receiving radiation from the chamber through optical openings in the first wall thereof. The terminal further includes a plurality of radiation reflectors which extend from a second wall of the chamber toward the first wall. The reflectors direct injected radiation along predetermined paths within the chamber to minimize absorption and scattering losses resulting from multiple reflections.

BRIEF DESCRIPTION OF THE DRAWINGS

While the specification concludes with claims particularly pointing out and distinctly claiming that which is regarded as the present invention, details of preferred embodiments of the invention may be more readily ascertained from the following technical description when read in conjunction with the accompanying drawings wherein:

FIG. 6 is a cross sectional view of an alternate transducer embodiment which might be used in practicing the invention;

FIG. 7 is a view of an elliptical-parabolic reflector showing the elliptic-parabolic surface of which the reflector is a subset; and FIG. 8 is a view of a revolution of a parabola used as a primary reflector.

FIG. 9 shows a reflecting cavity.

TECHNICAL DESCRIPTION

Figure 1:
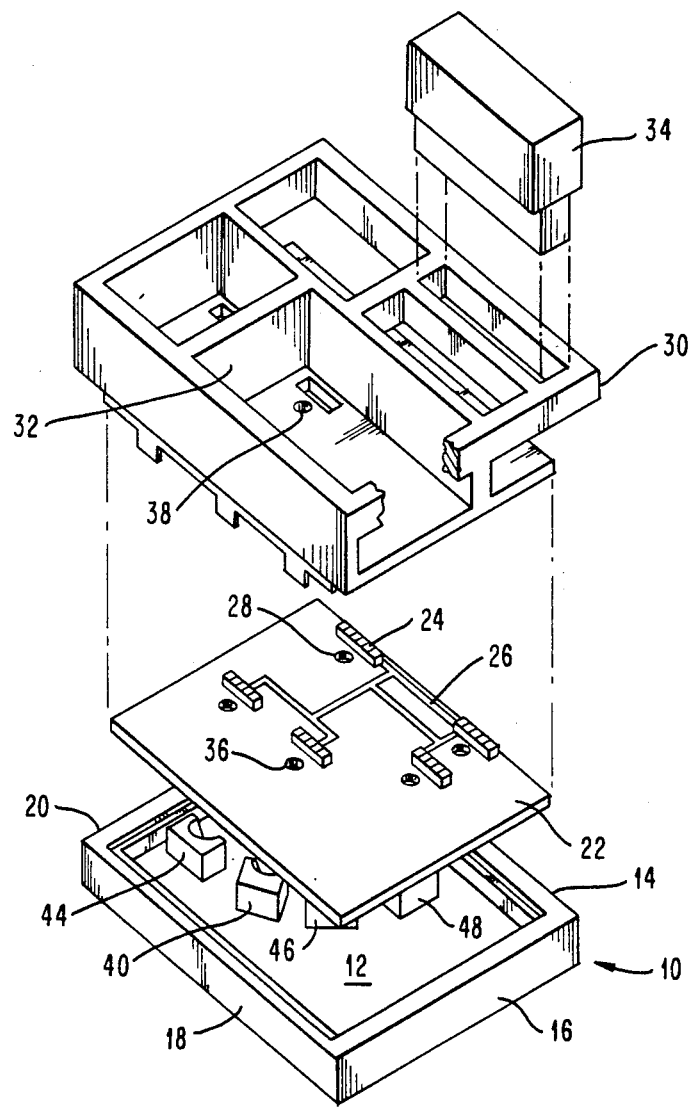
FIG. 1 is an exploded, perspective view of a terminal structure incorporating the inventive concept.

Referring to FIG. 1, the present invention is preferably used in a highly modular terminal including an optical chamber 10 having a bottom wall 12 and perpendicular side walls 14, 16, 18, 20. The initially open top of the chamber 10 is capped by a power substrate board 22 including a plurality of power connectors, such as connector 24. The connectors 24 are electrically linked by a pattern 26 of printed conductors. The substrate 22 has a series of holes or optically transparent ports, such as port 28.

A frame 30 rests on and may be connected to the substrate 22 and the walls of optical chamber 10 using conventional fastening techniques. Frame 30 includes a number of rectangular openings, such as opening 32, for pluggable, dedicated functional units. Unit 34 is an example of one type of functional unit which might be plugged into one of the openings in the frame 30. Electrical power is provided to each of the functional units through one of the power connectors 24 and a mating connector (not shown) protruding from the bottom surface of the functional unit. If each functional unit were to include its own power supply circuits, the connectors on substrate 22 might be connected directly to an external line voltage source. Alternatively, line voltage might be supplied through one of the connectors 24 to a power supply functional unit, such as the illustrated unit 34, which would, in turn, supply required AC or DC voltages to the remaining functional units through the printed conductors on substrate 22.

The optical chamber 10 serves as a communications medium linking each of the functional units plugged into the frame 30. Each functional unit includes a transducer which is in optical communication with the chamber 10 through aligned holes, such as holes 36 and 38 in the substrate and frame floor, respectively. As will be discussed in more detail later, each transducer includes a light emitting device, such as a light emitting diode, capable of injection optical energy into the chamber 10 and a detector such as a photo transistor, capable of detecting energy propagating through the chamber 10.

In accordance with the invention, the chamber 10 includes a plurality of radiation reflectors, such as reflector 40, extending from the floor of the chamber toward the substrate 22. The radiation reflectors confine radiation injected into the chamber to predetermined paths, including one or more other radiation reflectors. The preferred shape and placement of the radiation reflectors relative to the transducers is described in more detail later.

Figure 2:
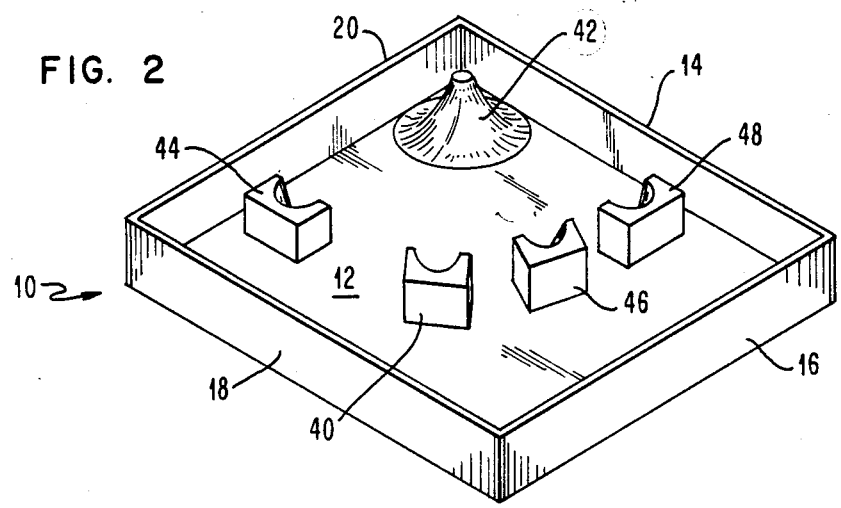
FIG. 2 is a perspective view of an optical chamber constructed in accordance with the present invention.

FIG. 2 is a perspective view of chamber 10 showing the radiation reflectors which would be used for providing communications between functional units which could be plugged into frame structure 30. In a preferred embodiment of the invention, there are basically two types of radiation reflectors. A primary radiation reflector is associated with a controller or processor component for the terminal device. Reflector 42 is an example of a primary radiation reflector.

The second type of radiation reflector is a secondary reflector or one associated with a "remote" functional unit such as a printer, a display, etc. Reflector 40 is an example of a secondary reflector unit. In FIG. 2, reflectors 44, 46, and 48 are also secondary reflector units.

The differences between primary and secondary reflectors are illustrated with reference to FIGS. 3 and 4.

Figure 3:
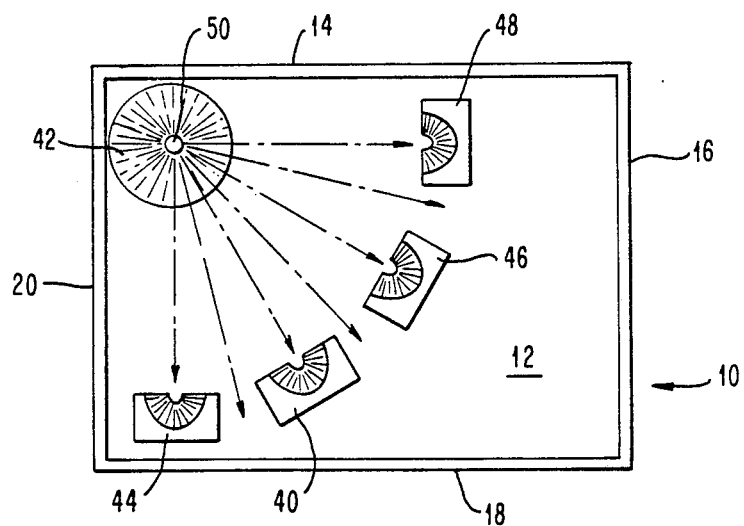
FIG. 3 is a plan view showing the distribution of optical energy originating at a master or controller component transducer.

Referring to FIG. 3, a primary reflector must distribute radiation from a focal point above towards the associated secondary reflectors. Therefore, energy which is incident upon the primary reflector 42 from a source in the functional unit above will be broadcast to all of the associated secondary reflectors 40, 44, 46, 48 and, consequently, to their functional units. This facilitates transmission of information from a controlling or processing functional unit above the primary reflector to the outlying secondary functional units.

Figure 4:
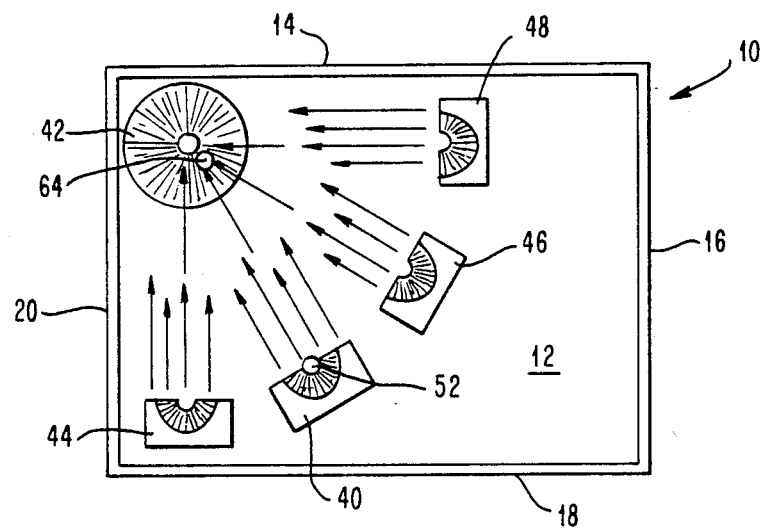
FIG. 4 is a plan view showing the distribution of optical energy from a plurality of remote transducers.

FIG. 4 illustrates the secondary reflectors 40, 44, 46, 48 directing light from their respective overhead sources toward the primary reflector 42. With the focal point of the secondary reflector as the location of the associated source, the transmitted light energy from the secondary functional units will be focussed upon the focal point of the primary reflector 42. This establishes communication of information from a secondary functional unit source 52 (associated with a printer or display, for example) to the primary functional unit detector 64. The light transmitted by source 52 does not impinge at significant levels on the remaining secondary reflectors 44, 46, 48 thus improving the signal to noise ratio of the chamber. For a given terminal application, it may be desirable to have sets of primary reflectors and associated secondary reflectors.

Referring to FIG. 8, the reflecting surface of the preferred primary reflector is a revolution of a parabola with the focus on the axis of revolution. The surface is represented by the focus of points (in cylindrical coordinates) $Z^2 = 4A(R-A) + \theta$ where A is a constant, R the radial component and $\theta$ the angular component ($Z<0$). The focus is at $R=0$, $Z=0$. Any cross section of this surface with a plane normal to the X-Y plane and including the point $X=0$, $Y=0$, $Z=0$ will be of a pair of parabolas which meet at the axis. Thus, any energy radiating from a source at the focus impinging on the parabola of revolution described will be radiated uniformly along vectors $B\theta + C$ where B and C are constants. All the energy will radiate parallel to the bottom of the chamber and appear to be sourced from the axis of revolution.

Referring to FIG. 7, the reflecting surface of the secondary radiation reflector elements is preferably an elliptic parabaloid. That is, when viewed in a plane defined by the X and Y coordinate axes, a cross sectional configuration of the reflector is a partial ellipse centered on the Z axis. A cross section of the reflector in the XZ plane would show a parabolic reflecting surface. As is known in the prior art, the surface of an elliptic parabaloid is defined by the focus of an equation of the form $X^2/A^2 + Y^2/B^2 = 2CZ$ where A, B and C are constants which define the major and minor axes (and relative focii) of the elliptic cross section as well as the spread and therefore the focus of the parabolic cross sections.

The elliptical component of the reflector surface serves to reflect light energy from or to the axis of the focus of the primary reflector to or from the Z axis through the focus of the secondary reflector. The parabolic contour serves to reflect light parallel to the chamber floor upward or toward the top of the chamber. Thus, the elliptic and parabolic components of the secondary reflector will image the primary reflectors focus. Likewise, the primary reflector will image any secondary reflector focus to its own.

Figure 5:
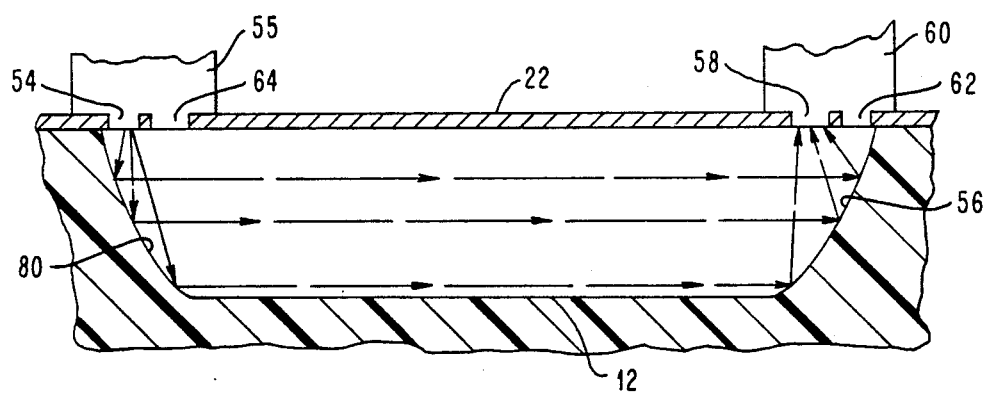
FIG. 5 is a simplified elevational view of the distribution of optical energy in a link between two spaced transducers.

As can be seen in FIG. 5, the parabolic contour 80 of a reflector surface will cause optical energy emanating from a source 54 to be reflected along paths parallel to the bottom surface 12 of the optical chamber. The parallel rays impinge on the surface of a second reflector 56 and are reflected from the parabolic contour of that reflector toward a detector 58 associated with a functional unit 60. Preferably, the emitter 54 of a functional unit 55 and a corresponding emitter 62 of functional unit 60 are located at focal points of both the elliptic and parabolic cross sections of the respective reflectors while the detector 58 for functional unit 60 and a corresponding detector 64 for functional unit 55 are located slightly off-center relative to the focal point. This arrangement is preferred since detection of optical energy is generally less critical than the proper distribution of that energy, which requires placement of the light source at the focal point. As a practical matter, the center-to-center spacing of emitters and detectors in a given functional unit is relatively small so that the eccentric placement of the detector has little effect on the operation of the device.

An alternative embodiment for two functional units which need to communicate would be a ellipsoidal half section. The source and detector for each functional unit would be at one of the two respective focii of the ellipsoid.

Referring to FIG. 9, all energy sourced from a source at focii A and directed into the cavity would be reflected once and only once directly to a detector at focii B. More secondary functional units could be accommodated using purely ellipsoidal sections by making one focus of each ellipsoid associated with secondary functional units at a common focii.

FIG. 6 discloses an alternate transducer embodiment which permits both the emitter and detector components of a transducer to be mounted coaxially at a reflector focal point for a given functional unit. A light emitting device 66, driven by a signal source 68, is mounted in the center of a sleeve of light conducting material 70. Optical energy injected into a cavity by sources associated with other functional units could be focussed along the center line of the light emitting element 66. A certain amount of this incident optical energy would be transmitted through the cylinder 70 to a light detecting element 72 coaxial with the light emitting element 66. The electrical signal provided by the light detecting element 72 could be processed in signal detector circuitry 74.

Since the optical energy is directed and focussed by the radiation reflectors from a desired emitter to one or more desired detectors with a minimum number of reflections, absorption losses are minimized in a terminal constructed in accordance with the present invention. The highly directional nature of the reflector geometry acts as a spatial filter to improve immunity to stray light from any optical noise source. A considerable amount of flexibility is retained in designing the terminal device. When the desired size and placement of the functional units has been established and the need for communications paths between the various functional units has been fixed, radiation reflectors of the desired elliptic paraboloid configuration can be created to carry out the necessary communication. The only requirements for placement of these reflectors are (1) that each must be below the emitter of an associated functional unit and (2) each should be free of any "shadows" cast by any of the other reflector structures. Since the number and size of reflector structures required in a typical terminal device is small relative to the floor area of the cavity, these requirements can normally be satisfied without undue difficulty. Preferably, the walls and floor of chamber 10 are molded plastic material. The radiation reflectors could be formed integrally with the remainder of the chamber during a one-step molding operation.

While there has been described what are considered to be preferred embodiments of the invention, variations and modifications therein will occur to those skilled in the art once they become acquainted with the basic concepts of the invention. Therefore, it is intended that the appended claims shall be construed to include both the preferred embodiments and all variations and modifications that fall within the true spirit and scope of the invention.

We claim:

1. A data processing terminal characterized by:
   a substantially enclosed chamber having interior walls;
   a plurality of functional units mounted outside the substantially enclosed chamber, each of said functional units having a transducer for injecting radiation into and for receiving radiation from the chamber through optical openings in a first wall thereof; and
   a plurality of radiation reflectors extending from a second wall toward the first wall, with the transducer for each functional unit being placed at the focal point of the respective reflector whereby said reflectors direct injected radiation along predetermined paths within the chamber so that absorption and scattering losses resulting from multiple reflections are being minimized.

2. A data processing terminal as defined in claim 1 wherein each of said reflectors has a substantially parabolic cross section taken along a plane normal to said first and second walls.

3. A data processing terminal characterized by:
   a substantially enclosed chamber having interior walls;
   a plurality of functional units mounted outside the substantially enclosed chamber, each of said functional units having a transducer for injecting radiation into and for receiving radiation from the chamber through optical openings in a first wall thereof; and
   a plurality of radiation reflectors extending from a second wall toward the first wall, said reflectors acting to direct injected radiation along predetermined paths within the chamber wherein one or more of said reflectors having a substantially parabolic cross section taken along a plane normal to the first and second walls and at least one or more of said reflectors having a substantially ellipsoid cross section taken along a plane parallel to the plane of said first and second wall.

4. A data processing terminal as defined in claim 1 wherein said radiation reflectors are integral with the second wall.

5. A data processing terminal as defined in claim 3 wherein said radiation reflectors are integral with the second wall.

6. A data processing terminal characterized by:
   a substantially enclosed chamber having interior walls;
   a plurality of functional units mounted outside the substantially enclosed chamber, each of said functional units having a transducer for injecting radiation into and for receiving radiation from the chamber through optical openings in a first wall thereof; and a plurality of radiation reflectors extending from a second wall toward the first wall, said reflectors acting to direct injected radiation along predetermined paths within the chamber wherein said radiation reflectors are integral with the second wall and the transducer in each of said functional units includes an emitter located at a focal point of the subject radiation reflector.

7. A data processing terminal as defined in claim 5 wherein the transducer in each of said functional units includes an emitter located at a focal point of the radiation reflector.

8. A data processing terminal characterized by:
a substantially enclosed chamber including first and second, opposed walls;
a plurality of functional units including a controller unit mounted outside the substantially enclosed chamber, each of said functional units having a transducer for injecting radiation into and for receiving radiation from the chamber through optical openings in the first wall;
a plurality of radiation reflectors extending from the second wall toward the first wall, each of said radiation reflectors being adapted to direct radiation injected by one of the transducers to one or more of the other transducers and to direct radiation received from other transducers onto its own transducer; and a radiation reflector extending from the second wall toward the first wall, said radiation reflector being operable to direct radiation injected into the cavity from the controller and to direct radiation received from other transducers into its own transducer.

9. A data processing terminal as defined in claim 8 wherein each of said reflectors has a substantially parabolic cross section taken along a plane normal to said first and second walls.

10. A data processing terminal as defined in claim 9 wherein one or more of said reflectors as a substantially ellipsoid cross section taken along a plane parallel to the plane of the first and second walls.

11. A data processing terminal as defined in claim 10 wherein said radiation reflectors are integral with the second wall.

12. A data processing terminal as defined in claim 10 wherein the radiation reflector associated with one of said functional units is adapted to distribute optical energy from that unit to the other radiation reflectors and to direct received optical energy from the other radiation reflectors toward its associated functional unit.

13. A data processing terminal as defined in claim 11 wherein the radiation reflector associated with one of said functional units is adapted to distribute optical energy from that unit to the other radiation reflectors and to direct received optical energy from the other radiation reflectors toward its associated functional unit.

14. A data processing terminal as defined in claim 13 wherein the transducer for each said functional unit includes an emitter component located at a focal point of the associated radiation reflector and an adjacent detector located eccentric to the focal point.

15. A data processing terminal as defined in claim 13 wherein the transducer for each said functional unit includes an emitter component, a detector component being disposed coaxially with the emitter component and means for directing optical energy past the emitter component onto the detector component.

16. A data processing terminal characterized by:
a substantially enclosed chamber having interior walls;
a plurality of functional units mounted outside the substantially enclosed chamber, each of said functional units having a transducer for injecting radiation into and for receiving radiation from the chamber through optical openings in a first wall thereof;
a first set of radiation reflectors extending from a second wall towards the first wall; said first set of radiation reflectors being operable for directing radiation injected into said cavity from at least one of the functional units; and
a second set of radiation reflectors extending from the second wall towards the first wall; said second set of radiation reflectors being operable for directing along predetermined paths within the chamber radiation reflected from said first set of radiation reflectors and radiation injected into the cavity from at least a different one of said functional units.

* * * * *